Patented May 3, 1949

2,468,747

UNITED STATES PATENT OFFICE 2,468,747

INTERPOLYMERS OF DRYING OILS, MONO-ALKENYL - AROMATIC HYDROCARBONS, AND DIVINYLBENZENE

Gerald A. Griess and Arthur S. Teot, Midland, Mich., assignors to The Dow Chemical Company, Midland, Mich., a corporation of Delaware No Drawing. Application June 25, 1947, Serial No. 757,064

11 Claims. (Cl. 260—23)

This invention concerns certain new interpolymers of drying oils and alkenyl-aromatic compounds, which interpolymers are adapted for use in coating compositions. It also pertains to a method of making the interpolymers and to coating compositions comprising the same.

It is known that styrene and drying oils may be interpolymerized in the presence of a mutual solvent, e. g. toluene, xylene, or ethylbenzene, etc., to obtain products which are soluble in usual varnish or lacquer solvents and from which solutions clear films of the interpolymers may be cast. However, several difficulties are encountered in the production and use of these known interpolymers. In order to obtain a soluble polymeric product suitable for use in coating compositions, it has been found important that the interpolymerization reaction be carried out in the presence of an inert solvent under carefully controlled conditions. Consequently, after completing the polymerization, it is frequently necessary that the solvent employed in the reaction be removed, or replenished, or at least partially replaced by different solvents in order to obtain compositions suitable for use in the casting of films. Such known interpolymers, capable of being cast as clear continuous films from solutions thereof, usually possess a further disadvantage of forming solutions which, when of a concentration suitable for laying down a film of the desired thickness, are too thin, or mobile, for convenient application, e. g. by brushing, to surfaces of wood or metal, etc., which are to be coated therewith. Said interpolymers have a further disadvantageous property, after being applied and dried as a film on a surface, of becoming soft and tacky at only moderately elevated temperatures, e. g. at 125° F. or thereabout.

It is a primary object of this invention to provide new interpolymers of drying oils and alkenyl-aromatic compounds, which interpolymers are relatively free from the above-mentioned objectionable characteristics and which, in particular, form films that remain free from tack at temperatures higher than those at which said known interpolymers of styrene and drying oils become tacky. A further object is to provide a simple method whereby the new interpolymers may be prepared en masse, i. e. without need for the presence of a solvent, so that after being produced they may be dissolved, in a desired concentration, directly in the solvent or solvents to be employed as a medium in compositions for casting films of the interpolymers.

Another object is to provide coating compositions comprising the new interpolymers and suitable for casting films of the latter. Other objects will be apparent from the following description of the invention.

The new interpolymers provided by the invention are prepared by polymerizing a mixture comprising (a) one or more drying oils; (b) styrene or styrene together with a lesser amount of an alkylated styrene such as alpha-methylstyrene, vinyl-toluene, or ethyl-vinylbenzene, etc.; and (c) a minor amount of divinylbenzene. The polymerization is preferably accomplished in the absence of solvents, but a minor amount, e. g. up to 10 per cent by weight, of a solvent such as benzene, toluene, xylene, or ethylbenzene, etc., may be present. The reason for carrying the polymerization out in the substantial absence of solvents is that the latter may retard somewhat the rate of polymerization and, further, that employment of a considerable amount of solvent in the polymerization may necessitate extra steps for removing at least a portion of the solvent from the interpolymer prior to formation of coating compositions comprising the product.

However, we have found that in order to assure formation of a uniform interpolymer which is compatible with linseed oil and usual varnish solvents such as benzene, toluene, xylene, or a mixture of such aromatic solvent and a lesser volume of mineral spirits, etc., it is important that the mixture subjected to polymerization in the substantial absence of solvents comprise a drying oil, or drying oils, having less than a certain degree of conjugation between the olefinic linkages thereof and that the drying oil, monoalkenyl-aromatic compound and divinylbenzene be employed in certain proportions. An average of less than 35, and preferably not more than 25, per cent of the olefinic linkages in the molecules of the drying oil should be conjugated with respect to one another. Employment of a drying oil, e. g. tung oil alone or oiticica oil alone, having a higher degree of conjugation usually results in formation of a non-uniform polymeric product which is not readily or completely compatible with usual varnish or lacquer solvents such as those mentioned above. However, mixtures of conjugated and unconjugated drying oils, e. g. of tung oil and linseed oil, may be used, provided the average degree of conjugation between olefinic linkages is within the limits given above. Other drying oils which may be employed are soyabean oil, linseed oil, sardine oil, dehydrated castor oil, or mixtures of such drying oils, etc.

The mono-alkenyl-aromatic component of the polymerization mixture is usually employed in amount corresponding to between 30 and 60, preferably between 40 and 50, per cent of the combined weight of the polymerizable organic materials, but there may be instances in which it can be used in proportions outside of these limits. Of the mono-alkenyl aromatic compounds which may be present in the polymerization mixture, styrene is the principal component. It may be used as the only such component, but is preferably used together with a lesser amount, e. g. between 1 and 40 per cent of its weight, of alpha-methyl-styrene or ethyl-vinylbenzene, etc. Alpha-methyl-styrene, in particular, appears to moderate the polymerization reaction and to facilitate somewhat the production of interpolymers having satisfactory properties.

Divinylbenzene is employed in amount not exceeding 5 per cent of the combined weight of the same, the drying oil, and the mono-alkenyl-aromatic components of the polymerization mixture. Employment of divinylbenzene in amount greater than 5 per cent of the combined weight of the polymerizable starting materials usually results in formation of a non-uniform polymer which does not readily dissolve to the extent desired in toluene or other varnish solvents.

The optimum proportions of divinylbenzene to be used in the polymerization mixture varies somewhat, depending on the kind of drying oil employed. When a substantially non-conjugated drying oil, such as linseed oil or soyabean oil, is used, the divinylbenzene may be employed in amounts corresponding to between 0.5 and 5, preferably between 1.5 and 2.5, per cent of the combined weight of all of the polymerizable compounds. When a partially conjugated drying oil (e. g. dehydrated castor oil having about 25 per cent of its olefinic linkages conjugated) is used, the divinylbenzene is employed in amount corresponding to between 0.5 and 2, preferably between 1.25 and 1.75, per cent of the combined weight of all of the polymerizable starting materials.

The divinylbenzene enters into the polymerization reaction and causes formation of an interpolymer which becomes tacky at temperatures higher than those that cause tackiness in an interpolymer formed in the absence of the divinylbenzene under otherwise similar conditions. Within the limits of the proportions of divinylbenzene which may satisfactorily be used, the temperatures required to render the products tacky become higher with increase in the proportion of divinylbenzene employed in forming the same.

The interpolymers comprising chemically combined divinylbenzene usually form solutions which, when of a given concentration, are more viscous than similar solutions of interpolymers formed in the absence of divinylbenzene from otherwise similar starting materials and under similar polymerization conditions. However, this increase in viscosity usually is not great.

The order in which the polymerizable organic materials are admixed may be varied. When employing a drying oil, or a drying oil mixture having a considerable degree of conjugation between olefinic linkages thereof, e. g. dehydrated castor oil, the oil, styrene, divinylbenzene, and any other mono-alkenyl-aromatic compounds to be employed are preferably admixed in the proportions hereinbefore stated and the mixture is heated to effect polymerization. Alternatively, the divinylbenzene or a mixture thereof with the styrene or other mono-alkenyl-aromatic compounds may be added gradually or in portions to the drying oil while heating the latter at a polymerization temperature. The procedure last mentioned is preferred when the drying oil is a non-conjugated one, such as linseed or soyabean oil, but if desired, all of the materials to be polymerized may be admixed prior to carrying out the polymerization.

The polymerization is accomplished by heating the mixture, preferably in a closed container or in contact with an inert gas such as nitrogen, methane, or ethane, etc., at temperatures between 100° and 200° C., but lower or somewhat higher temperatures may be employed. The reaction is continued until at least 80 per cent, and preferably more than 95 per cent, of the alkenyl-aromatic components of the mixture have been consumed, but the product remains readily soluble in, or compatible with, unbodied linseed oil. The proportion of the alkenyl-aromatic components remaining unpolymerized may be determined by periodically withdrawing samples of the mixture and testing them in known ways, e. g. to determine the degree of unsaturation of such sample or the vapor pressure thereof at a given temperature. As the polymerization progresses, the mixture becomes less unsaturated and its vapor pressure decreases. When carrying the polymerization out in a closed reactor at a constant temperature, the extent of the polymerization may be followed by observing the decrease in vapor pressure as the reaction continues. The time required for the polymerization varies depending upon the kind of drying oil used, whether a catalyst is employed, and the proportion of divinylbenzene present, but is usually in the order of from ten hours to two days.

By the procedure just described, the interpolymers may be obtained as clear transparent resinous bodies which may readily be dissolved in usual varnish solvents, e. g. aromatic solvents such as benzene, toluene, xylene, ethyl-benzene, or a mixture of one or more of such aromatic solvents with mineral spirits, to form varnishes suitable for application to surfaces of wood, cloth, paper, or metals, etc. In most instances, a mixture of one part by volume of an aromatic solvent and between 0.75 and 1.25 parts of mineral spirits has been employed by us in preparing such varnishes. Usually, the varnish is prepared so as to contain from 50 to 75, preferably from 55 to 65, per cent by weight of the dissolved interpolymer, but it may be of lower or higher concentrations. Other usual addition agents such as rosin, resins, drying oils, paint driers, or coloring agents such as dyes or pigments, etc., may be added. By intimately admixing a finely ground pigment with the varnish, an enamel may be obtained.

After applying the varnish or enamel to a surface, e. g. by brushing, and evaporating the solvent, the film thus deposited hardens gradually on standing in contact with air at room temperature or may be hardened more rapidly, e. g. in from 1 to 10 hours, by heating the same at temperatures in the order of 120° C. The cured films are clear, uniform and of good appearance. They are non-tacky at room temperature and remain free of tack, i. e. they are not sticky, at moderately elevated temperatures such as 150° F. or higher. They adhere well to most surfaces, e. g. of wood, paper, cloth, or metal, etc., on which they are formed. Accordingly, the varnishes and enamels are well adapted for general use as coating compositions.

The following examples describe certain ways in which the invention has been practiced, but are not to be construed as limiting its scope.

EXAMPLE 1

In each of a series of experiments, alkali refined linseed oil was heated at a temperature of 150° C. and a solution of styrene, alpha-methyl-styrene, ethyl-vinylbenzene, divinylbenzene, and benzoyl peroxide in the relative proportions indicated in the following table was added with stirring at a rate such as to avoid spontaneous heating of the mixture to temperatures higher than about 155° C. Each mixture was maintained at a temperature of 150° C., or thereabout, for a total of 24 hours, after which it was heated to 200° C. for another 24 hours. In each instance, the product was a clear, transparent and nearly colorless resin. A portion of each product was dissolved in toluene to form a solution of 80 per cent concentration, by weight, and the viscosity of the solution was determined. The table gives the Gardner-Holdt viscosity values of the solutions thus prepared. Another portion of each of the resinous products was dissolved in a mixture of equal parts by volume of toluene and of mineral spirits (boiling at temperatures of from 155° to 210° C. at atmospheric pressure) to form a solution containing approximately 60 per cent by weight of the resinous interpolymer. A steel panel was dipped in each such solution, removed, and solvent was permitted to evaporate from the varnish film thus deposited on the panel. Each film of varnish was cured by heating the panel bearing the same at a temperature of 120° C. for the time given in the table. After being cured, each film was tack-free at room temperature. For purpose of determining the effect of elevated temperatures on the cured films, each film was heated at a temperature of 158° F. while pressing the same against a felt pad under a pressure of 250 grams per square inch for a period of one hour. The film was then lifted from the pad and examined for adherence of felt fibers thereto. Film free of tightly adhering fiber was non-tacky at 158° F. Film having a surface thereof largely covered with adhering fiber was very tacky at said temperature. The table names and gives the per cent by weight of each component of the mixture polymerized in forming the interpolymers. It gives the Gardner-Holdt viscosities of 80 per cent solutions of the respective interpolymers in toluene, the time in hours employed in curing a film of each interpolymer by heating the same at 120° C., and the results of the tests just described for determination of the tackiness at 158° F. of the cured films. In the table, the abbreviations "LO," "S," "alpha-Me-S," "E. V. B.," "D. V. B.," and "Bz2O2" are used to designate linseed oil, styrene, alpha-methyl-styrene, ethyl-vinylbenzene, divinylbenzene, and benzoyl peroxide, respectively.

The cured films obtained in runs 2-4 were sufficiently free from tack to be satisfactory for use at mid-summer temperatures in all parts of the world.

EXAMPLE 2

A mixture of 53 per cent by weight of dehydrated castor oil, 31.1 per cent of styrene, 13.3 per cent of alpha-methyl-styrene, 0.3 per cent of ethyl-vinylbenzene, 0.2 per cent of divinylbenzene, and 2 per cent of benzoyl peroxide was polymerized to a clear resin by heating the same at 150° C. for 2.5 hours and thereafter at 200° C. for 21.5 hours. The product was readily soluble both in alkali refined linseed oil and in toluene. The resin was dissolved in a mixture of equal volumes of toluene and mineral spirits to form a varnish containing 60 per cent by weight of the polymer and the varnish was applied as a film to a metal panel. The panel was heated at 110° C. for purpose of curing the polymer. It was observed that such film was tack-free at room temperature after 20 minutes of heating and that it was hardened satisfactorily at the close of 3 hours 50 minutes of heating. The cured film was of good appearance, adhered tightly to the panel on which it was formed, and was tack-free at ordinary temperatures for all parts of the world.

Other modes of applying the principle of the invention may be employed instead of those explained, change being made as regards the method or products herein disclosed, provided the steps or compounds stated by any of the following claims or the equivalent of such stated steps or compounds be employed.

We therefore particularly point out and distinctly claim as our invention:

1. A method of making a clear varnish resin that is readily soluble in toluene which method comprises interpolymerizing in the substantial absence of solvents: (a) a drying oil having less than 35 per cent of its olefinic linkages conjugated, (b) a polymerizable mono-alkenyl-aromatic hydrocarbon material wherein each mono-alkenyl-aromatic component contains from 8 to 10 carbon atoms in the molecule and comprising styrene as its major component, and (c) divinylbenzene, the divinylbenzene and the mono-alkenyl-aromatic hydrocarbon material being employed in amounts corresponding to between 0.5 and 5 per cent and between 30 and 60 per cent, respectively, of the combined weight of the polymerizable organic components and the polymerization being carried out at temperatures between 100° and 200° C. to a point at which at least 80 per cent by weight of the alkenyl-aromatic compounds are reacted.

2. An interpolymer of (a) a drying oil having less than 35 per cent of its olefinic linkages conjugated, (b) a polymerizable mono-alkenyl-aromatic hydrocarbon material wherein each mono-alkenyl-aromatic component contains from 8 to 10 carbon atoms in the molecule and comprising Table

| Run No. | Polymerization Mixture | | | | | | Viscosity | Curing Time, Hrs. | Tackiness at 158° F. |
|---|---|---|---|---|---|---|---|---|---|
| | LO | S | Alpha-Me-S | EVB | DVB | Bz2O2 | | | |
| | Per cent | Per cent | | Per cent | Per cent | Per cent | | | |
| 1 | 48 | 34.3 | 14.7 | 0.6 | 0.4 | 2 | I | 10 | Very. |
| 2 | 48 | 33.6 | 14.4 | 1.2 | 0.8 | 2 | H to I | 10 | Appreciable. |
| 3 | 48 | 32.9 | 14.1 | 1.8 | 1.2 | 2 | S | 10 | Slight. |
| 4 | 48 | 31.5 | 13.5 | 3.0 | 2.0 | 2 | W | 5 | None. | styrene as its major component, and (c) divinylbenzene, which interpolymer comprises, in chemically combined form, between 0.5 and 5 per cent by weight of divinylbenzene and between 30 and 60 per cent of the mono-alkenyl-aromatic hydrocarbon material.

3. An interpolymer, as claimed in claim 2, wherein the drying oil is a substantially non-conjugated drying oil and the divinylbenzene is chemically combined in amount corresponding to between 1.5 and 2.5 per cent of the weight of the interpolymer.

4. An interpolymer, as claimed in claim 2, wherein the drying oil is linseed oil and the divinylbenzene is chemically combined in amount corresponding to between 1.5 and 2.5 per cent of the weight of the interpolymer.

5. An interpolymer, as claimed in claim 2, wherein the mono-alkenyl-aromatic hydrocarbon material is styrene and the divinylbenzene is chemically combined in amount corresponding to between 1.5 and 2.5 per cent of the weight of the interpolymer.

6. An interpolymer, as claimed in claim 2, wherein the mono-alkenyl-aromatic hydrocarbon material comprises a major amount of styrene and a minor amount of alpha-methyl-styrene, and the divinylbenzene is chemically combined in amount corresponding to between 1.5 and 2.5 per cent of the weight of the interpolymer.

7. An interpolymer, as claimed in claim 2, wherein the drying oil is linseed oil, the mono-alkenyl-aromatic hydrocarbon material consists of a major amount of styrene and minor amounts of alpha-methyl-styrene and ethyl-vinyl-benzene, and the divinylbenzene is chemically combined in amount corresponding to between 1.5 and 2.5 per cent of the weight of the interpolymer.

8. An interpolymer, as claimed in claim 2, wherein the drying oil is dehydrated castor oil, the mono-alkenyl-aromatic hydrocarbon material consists of a major amount of styrene and minor amounts of alpha-methyl-styrene and ethyl-vinylbenzene, and the divinylbenzene is chemically combined in amount corresponding to between 1.5 and 2.5 per cent of the combined weight of the interpolymer.

9. A varnish comprising a solution of the interpolymer of claim 2 in an organic solvent rich in aromatic hydrocarbons, which solution contains from 50 to 75 per cent by weight of said interpolymer.

10. A varnish comprising a solution of the interpolymer of claim 7 in an organic solvent rich in aromatic hydrocarbons, which solution contains from 55 to 65 per cent by weight of said interpolymer.

11. A varnish comprising a solution of the interpolymer of claim 8 in an organic solvent rich in aromatic hydrocarbons, which solution contains from 55 to 65 per cent by weight of said interpolymer.

GERALD A. GRIESS.
ARTHUR S. TEOT.

REFERENCES CITED

The following references are of record in the file of this patent:

UNITED STATES PATENTS

| Number | Name | Date |
|---|---|---|
| 1,811,078 | Dykstra | June 23, 1931 |
| 2,392,710 | Wakeford | Jan. 8, 1946 |
| 2,395,504 | Rubens | Feb. 26, 1946 |